United States Patent [19]
Takasan et al.

[11] Patent Number: 5,938,151
[45] Date of Patent: Aug. 17, 1999

[54] COMMUNICATION SYSTEMS EMPLOYING POWER CABLES FOR CONVEYOR CARRIAGES

[75] Inventors: Masaki Takasan; Yasuharu Odachi, both of Kariya, Japan

[73] Assignee: Kabushiki Kaisha Toyoda Jidoshokki Seisakusho, Karya, Japan

[21] Appl. No.: 08/949,499

[22] Filed: Oct. 14, 1997

[30] Foreign Application Priority Data

Oct. 16, 1996 [JP] Japan ..................................... 8-273477

[51] Int. Cl.[6] ........................................................ B61L 3/00
[52] U.S. Cl. ............................. 246/194; 191/10; 104/297
[58] Field of Search ........................ 246/8, 63 R, 63 C, 246/63 A, 194; 191/10; 340/310.01; 104/297

[56] References Cited

U.S. PATENT DOCUMENTS

| | | | |
|---|---|---|---|
| 2,591,022 | 4/1952 | Sorensen | 246/8 |
| 3,290,626 | 12/1966 | Hafner | 246/8 |
| 3,636,508 | 1/1972 | Ogilvy et al. | 246/8 |
| 3,694,751 | 9/1972 | Takahashi et al. | 246/8 |
| 4,449,685 | 5/1984 | Salmon et al. | 246/8 |
| 5,012,749 | 5/1991 | Passage | 104/297 |
| 5,467,718 | 11/1995 | Shibata et al. | 191/10 |
| 5,491,463 | 2/1996 | Sargeant et al. | 340/310.01 |
| 5,619,078 | 4/1997 | Boys et al. | 191/10 |
| 5,745,027 | 4/1998 | Malville | 340/310.01 |

Primary Examiner—Mark T. Le
Attorney, Agent, or Firm—Morgan & Finnegan, L.L.P.

[57] ABSTRACT

A system for communication between a fixed station and a carriage, which travels along a rail. The system employs a cable used to supply the carriage with electric power and carries out communication by superimposing communication signals on the electric power flowing through the cable. The communication system includes electric power sources and cables. The cables are each connected to one of the power sources and each cable extends along the rail. A single communication antenna is used by at least two of the cables.

20 Claims, 6 Drawing Sheets

COMMUNICATION SYSTEMS EMPLOYING POWER CABLES FOR CONVEYOR CARRIAGES

BACKGROUND OF THE INVENTION

1. Field of the Invention

The present invention relates to communication systems employing power cables for conveyor carriages. More particularly, the present invention pertains to a system for conducting communications between conveyor carriages and fixed stations which superimposes for this system signals on the electric power supplied through the power cables for this system.

2. Description of the Related Art

Conveyor carriages that travel along a suspended rail in a factory or in a storage area to transfer articles between stations are known in the prior art. A fixed station is provided on the ground to communicate with and control the operation of each carriage. In the prior art, communication between the fixed station (key station) and the carriages (local stations) is carried out through a trolley wire that extends along the rail. However, contact between the trolley wire and a collecting brush tends to cause abrasion of the trolley wire. In addition, the installation of the trolley wire and the power cable is burdensome since they must be installed separately along the rail.

Japanese Unexamined Patent Publication Nos. 5-344603 and 6-153305 describe a system that enables the carriages to produce electric power through electromagnetic induction. In the system, each carriage is provided with a pickup coil that is opposed to a power cable in a non-contacting state to induce electric power from the cable.

The present applicant proposed a system for carrying out communication through the power cable without using a trolley wire. In this proposal, a fixed station and the carriages are each provided with an antenna to superimpose communication signals on the high frequency electric power flowing through the power cable. The communication signals exchanged between the carriages and the fixed station are transmitted and received through the antennas.

However, there are certain disadvantages in such a communication system. For example, as shown in the conveying system of FIG. 1, a plurality of power cables 82a, 82b are employed when using a relatively long rail. Electric power sources 81 are connected to cables 82a, 82b, respectively. The cables 82a, 82b are arranged along predetermined sections of a rail 84, along which carriages 83 travel. If only a single cable were to be installed along such a long rail, this would increase the length of power transmission and cause problems such as voltage drop in the cable. To solve such problems, a large electric power source may be employed to increase the amount of electric current supplied to the power cable. However, this would increase the diameter and weight of the cable and add to the burden of the installation of the cable. Thus, the plural cable method shown in FIG. 1 solves voltage drop problems and installation problems.

However, when using the method of FIG. 1, each cable 82a, 82b must be provided with an antenna 85. The cables 82a, 82b are connected to the associated antenna 85, which is located near its power source 81, and to the fixed station 87 by way of a modem 86. Furthermore, when the distance between the antenna 85 and the fixed station 87 is long, a relay is necessary to maintain the strength of the communication signals. In addition, when the rail branches off into a plurality of rails, a power source and a power cable must be provided for each additional rail. This again leads to the problems described above.

SUMMARY OF THE INVENTION

Accordingly, it is an objective of the present invention to provide a communication system that does not require communication devices for each of the plurality of power cables that are connected to the plurality of power sources.

To achieve the above objective, the present invention provides a system for carrying out communication between a fixed station and a carriage moved along a rail. The system employs cable to supply the carriage with electric power. The system also carries out communication by superimposing communication signals on the electric power flowing through the cable. The system includes at least two electric power sources and a cable connected to each power source. Each cable is arranged to extend along the rail. The system further includes a communication antenna shared by a set of the cables. The set includes at least two separate ones of the cables.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
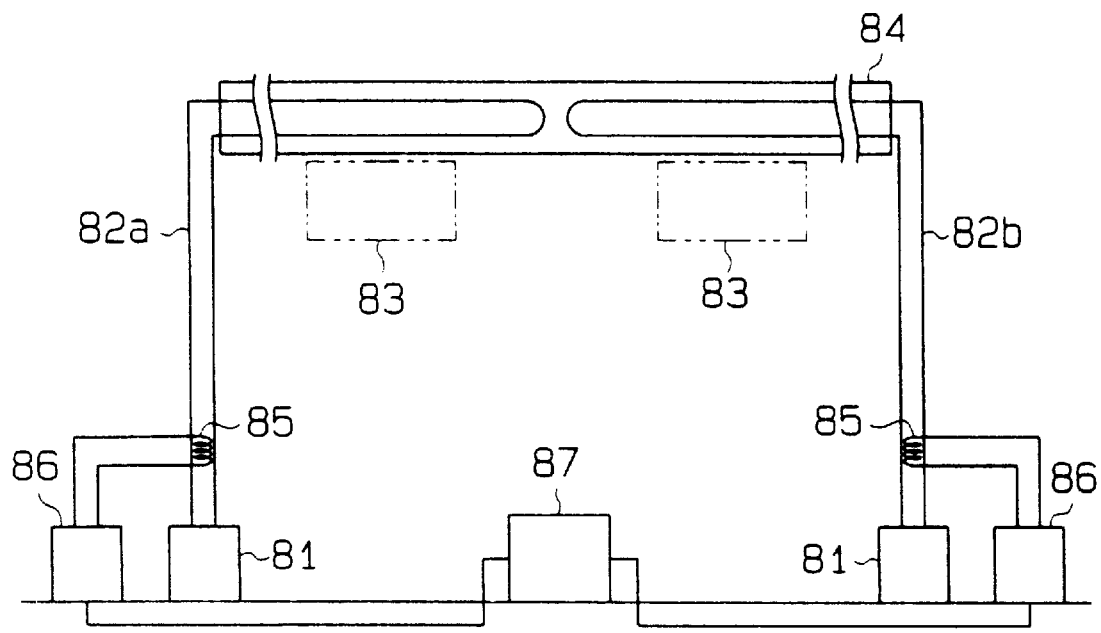
FIG. 1 is a diagrammatic view showing a prior art conveying system.
Figure 2:
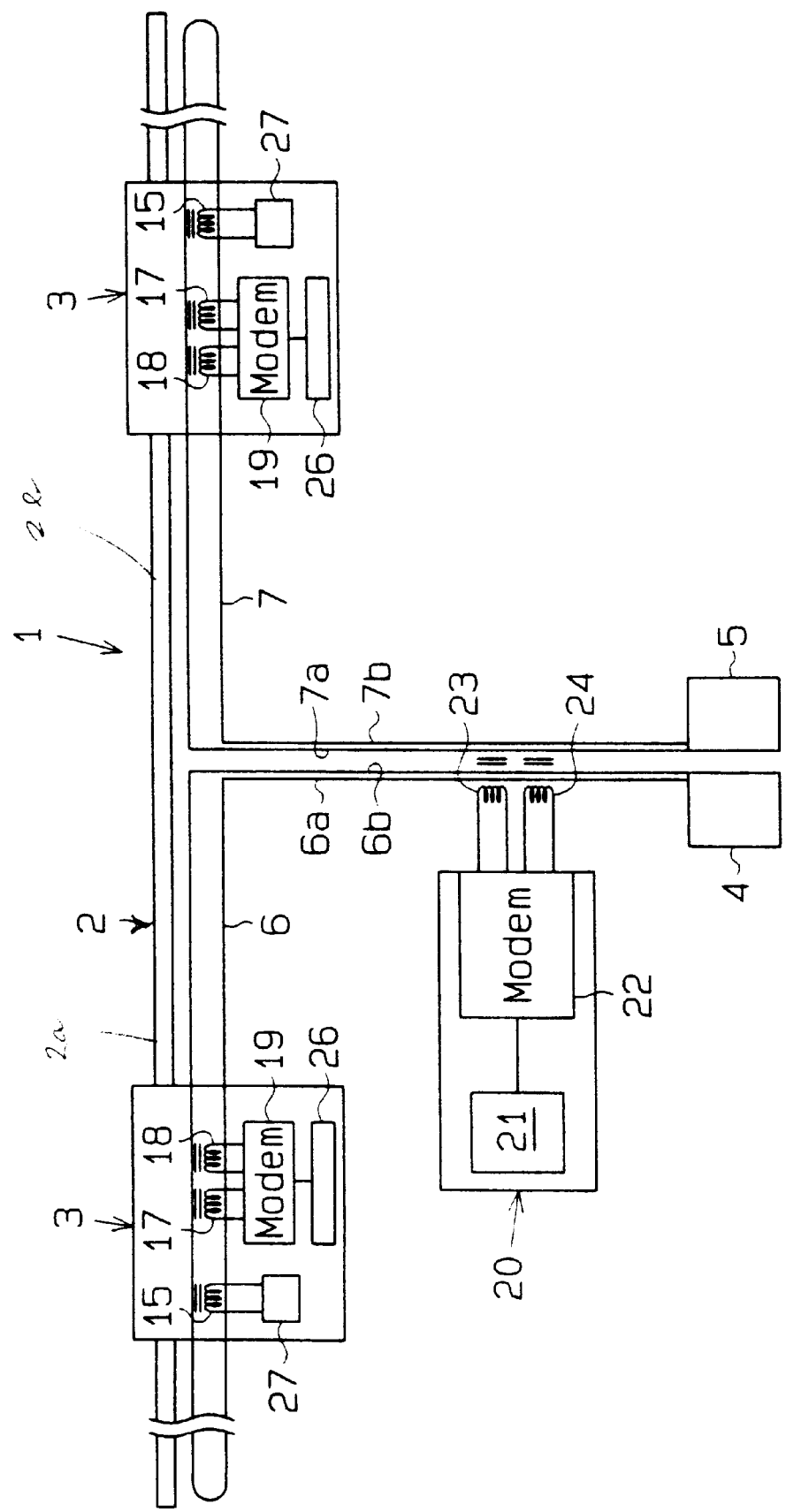
FIG. 2 is a diagrammatic view showing a conveying system according to a preferred embodiment of the present invention.

FIG. 2 shows a conveying system 1 according to one embodiment of the present invention. As shown in the drawing, a plurality of conveyor carriages 3 travel along a suspended rail 2, which is substantially straight. The rail 2 is relatively long. The rail 2 is divided longitudinally into substantially two sections having equal lengths. A power cable 6 is arranged in one of the areas along the rail 2 while another power cable 7 is arranged in the other area along the rail 2. The cable 6 is connected to a high frequency electric power source 4 while the cable 7 is connected to another high frequency power source 5. Each cable 6, 7 has two ends that are connected to the associated power sources 4, 5. The cables 6, 7 are bent at the associated ends of the rail 2. Thus, each cable 6, 7 has an ingoing leg and an outgoing leg that are parallel to each other and that extend along the rail 2. The cables 6, 7 approach each other at the middle section of the rail 2. From the middle section, the cables 6, 7 extend closely and parallel to each other along a beam (not shown). The beam leads the cables 6, 7 downward to the associated power sources 4, 5. The power sources 4, 5 are located close to each other and supply the associated cables 6, 7 with high frequency electric power. Each cable 6, 7 is capable of maintaining the high frequency electric power without a problematic voltage drop.

Figure 4:
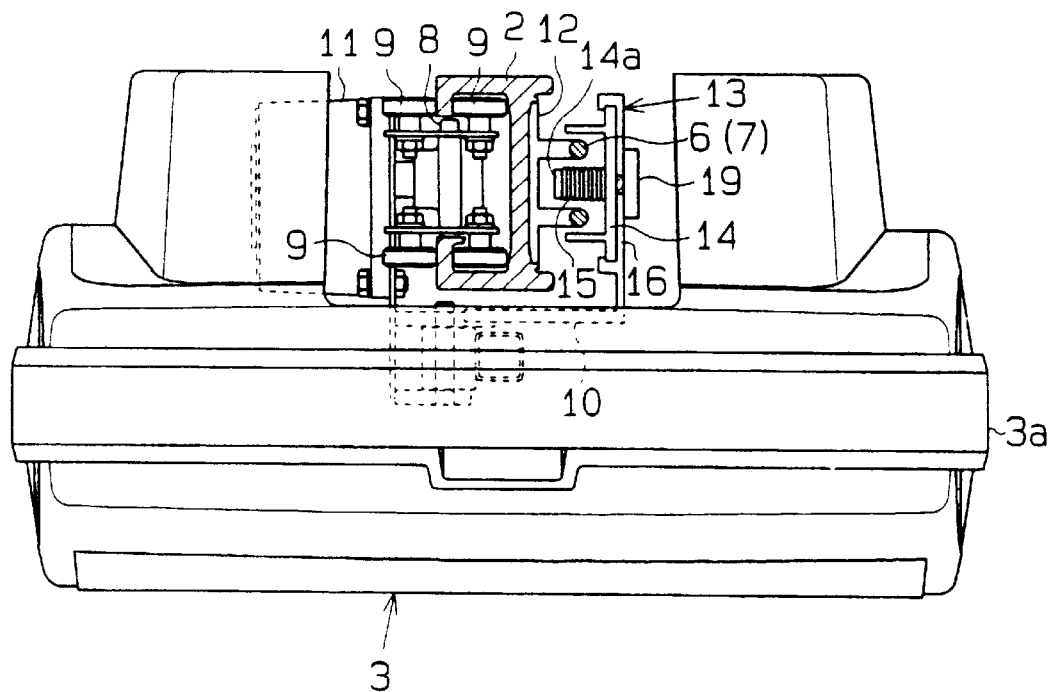
FIG. 4 is a front view showing a carriage mounted on a rail, the rail being shown in cross-section.

As shown in FIG. 4, each carriage 3 has a front drive wheel 8, a front driven wheel (not shown), a rear drive wheel, and a rear driven wheel (not shown). The carriage 4 also has a plurality of guide wheels 9. The guide wheels 9 are arranged to hold the rail 2 in between and enable the carriage 3 to travel along the rail 2. The carriage 3 has a body 3a. Front and rear steering units 10 are provided on the upper part of the body 3a. The drive and guide wheels 8, 9 and the driven wheels are supported on the steering units 10 to steer the carriage 3 along the rail 2. A motor 11 is provided for each steering unit 10 to drive the associated drive wheel 8.

A plurality of supporters 12 are arranged along the rear surface of the rail 2 (the right surface as viewed in FIG. 4) at equal intervals in the longitudinal direction. The cables 6, 7 are supported by the distal end of the supporters 12 so that the outgoing and ingoing legs extend parallel to each other with a predetermined space in between.

Each steering unit 10 is provided with a power induction device 13 that opposes the associated cable 6, 7 in a non-contacting manner. The induction device 13 has an E-shaped cross-section and includes a ferrite core 14. The ferrite core 14 has a projection 14a and an induction coil 15 wound about the projection 14a. The induction coil 15 is arranged between the ingoing and outgoing legs of the cables 6, 7.

Figure 5:
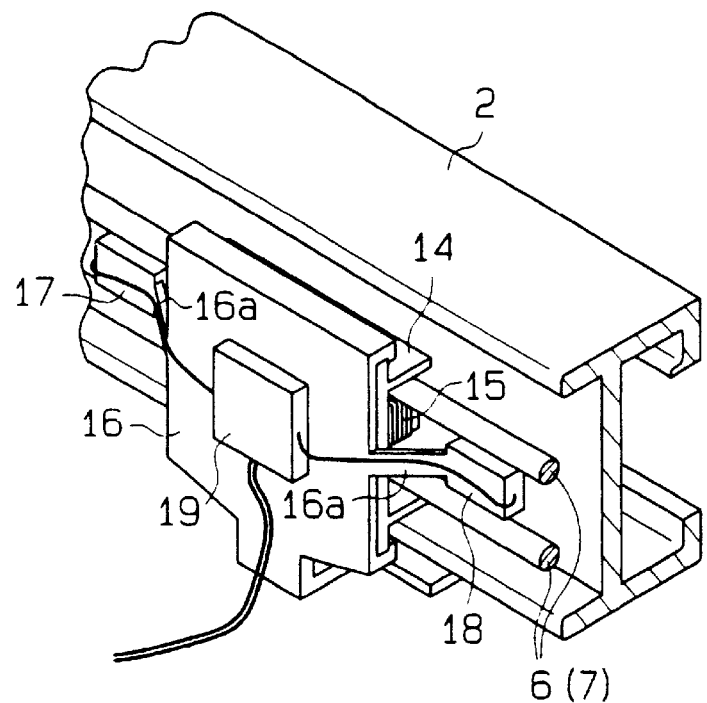
FIG. 5 is a fragmentary perspective view of a power induction device of a carriage provided with antennas.

As shown in FIG. 5, the induction device 13 is provided with a bracket 16 for holding the ferrite core 14. The bracket 16 has a pair of supporting portions 16a that extend integrally from each side of the bracket 16. A transmission antenna 17 is connected to the distal end of one of the supporting portions 16a while a reception antenna 18 is connected to the distal end of the other supporting portion 16a. The transmission and reception antennas 17, 18 are arranged between the outgoing and ingoing legs of the associated cables 6, 7. A modem 19 is attached to the rear surface of the holder 16. The antennas 17, 18 are connected to the modem 19.

As shown in FIG. 2, a fixed station 20 is provided on the ground to control the operation of the carriages 3. The fixed station 20 includes a microcomputer 21, which is connected to a modem 22. A coiled transmission antenna 23 and a coiled reception antenna 24 are connected to the modem 22.

Figure 3:
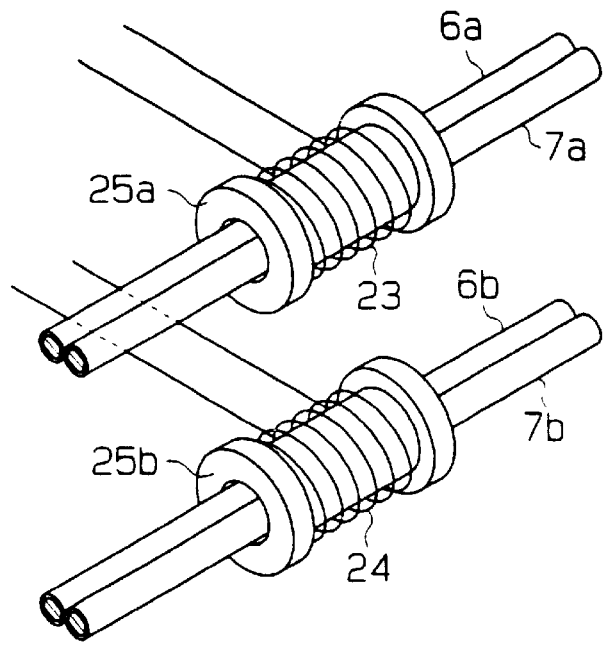
FIG. 3 is a fragmentary perspective view showing a structure for securing a transmission antenna and a reception antenna.

As shown in FIG. 3, cable legs 6a, 7a, which are connected to different power sources 4, 5, are inserted together through a bobbin 25a. The transmission antenna 23 is wound about the bobbin 25a. Thus, the same transmission antenna 23 is used for both cables 6, 7. In the same manner, cable legs 6b, 7b, which are connected to different power sources 4, 5, are inserted together through a bobbin 25b. The reception antenna 24 is wound about the bobbin 25b. Thus, the reception antenna 24 is used for both cables 6, 7.

With reference to FIG. 2, the microcomputer 21 generates signals that are transmitted to each carriage 3. The signals correspond with operation command data that are input by an operator through an input device provided at a station or correspond with operation data sent from each carriage 3. The modem 22 receives command signals from the microcomputer 22. The command signals are converted to signals having a predetermined frequency f1 and sent to the transmission antenna 23. The modem 22 further receives high frequency electric power through the reception antenna 24 and filters out the communication signals superimposed on the high frequency electric power. The modem 22 then digitizes the communication signals and sends the digitized communication signals to the microcomputer 21.

Each carriage 3 has a central processing unit (CPU) 26 that is arranged on a mother board (not shown) and connected to the modem 19. The CPU 26 controls the operation of the carriage 3. The modem 19 functions in the same manner as the modem 22 of the fixed station 20. In other words, the modem 19 receives digital signals from the CPU 26, converts the digital signals to signals having a predetermined frequency f2, and sends the converted signals to the transmission antenna 17. The modem 19 further receives high frequency electric power from the reception antenna 18 and separates signals having frequency f1 from the high frequency electric power. The modem 19 then digitizes the separated signals and sends the signals to the CPU 26. In this manner, communication is carried out by way of the cables 6, 7 between the fixed station 20 and each carriage 3. This enables the operation of each carriage 3 to be controlled by command signals sent from the fixed station 20.

Each carriage 3 is provided with an electric power circuit 27 that is connected to the induction coil 15. The power circuit 27 receives induced electromotive force from the induction coil 15, rectifies the induced electromotive force, and produces voltage that drives the CPU 26 and the motors 11. The frequency f1 of the signals sent from the fixed station 20 to the carriages 3 differs from the frequency f2 of the signals sent from the carriages 3 to the fixed station 20. This enables the fixed station 20 and the carriages 3 to simultaneously transmit and receive signals. At the middle section of the rail 2, the cables 6, 7 are arranged so that they do not interfere with the carriages 3 when the carriages 3 move to the other section of the rail 2. Thus, each carriage 3 is capable of traveling along the entire rail 2.

The operation of the conveying system 1 will now be described. In each carriage 3, the induction coil 15 of the induction device 15 receives the high frequency electric power flowing through the associated cables 6, 7 and produces induced electromotive force. The power circuit 27 converts the induced electromotive force to a three phase alternating current. The current is sent to each motor 11 to move the carriage 3 along the rail 2.

The microcomputer 21 sends frequency f1 signals to the two cable legs 6a, 7a by way of the modem 22 and the transmission antenna 23. The frequency f1 signals are superimposed on the high frequency electric power flowing through each cable leg 6a, 7a. The signals are sent to each carriage 3 through the cables 6, 7. The reception antenna 18 of each carriage 3 receives the high frequency electric power. The modem 19 then separates frequency f1 signals from the high frequency electric power and sends digital signals to the CPU 26.

When sending signals from the carriages 3 to the fixed station 20, the reception antenna 24 receives the signals regardless of whether the signal originating carriage 3 is located in the section of cable 6 or the section of cable 7. In other words, if the carriage 3 is located in the section of the cable 6, the reception antenna 24 receives the high frequency electric power flowing through the cable leg 6b. If the carriage 3 is located on in the section of the cable 7, the reception antenna 24 receives the high frequency electric power flowing through the cable leg 7b.

In this manner, cables 6, 7, which are connected to different power sources 4, 5, are both engaged with the bobbins 25a, 25b. Furthermore, the bobbins 25a, 25b are connected with the transmission or reception antennas 23, 24. This structure enables the same antennas 23, 24 to be used for different cables 6, 7.

Furthermore, the antennas are connected to only one modem 22. This enables the fixed station 20 to be arranged in the vicinity of the modem 22 (in this embodiment, the modem 22 is incorporated in the fixed station 20). As a result, the lengths of wires connecting the modem 22 and the microcomputer 21 are minimized. Thus, it is not necessary to provide a relay between the modem 22 and the microcomputer 21.

The cables 6, 7 extend toward the associated power sources 4, 5 from the middle of the rail 2. This structure relatively shortens the maximum transmission distance of signals. Thus, the attenuation of signals is suppressed even if the carriages 3 are located at the far ends of the rail 2. This enhances the communication reliability.

The cable legs 6a, 7a are bundled together by the bobbin 25a while the cable legs 6b, 7b are bundled together by the bobbin 25b. This structure prevents displacement of the cable legs 6a, 7a and the cable legs 6b, 7b. Furthermore, excessive loads are not applied to the antennas 23, 24.

The antennas 23, 24 may be located at an arbitrary position between the power sources 4, 5 and the rail 2. Thus, the antennas 23, 24 may be connected to the cables 6, 7 close to the rail 2. In other cases, the cables 6, 7 may be located at a relatively low position to facilitate the connecting of the antennas 23, 24 to the cables 23, 24.

The value of frequency f1 used for transmitting signals from the fixed station 20 to the carriages 3 differs from the value of the frequency f2 used for transmitting signals from the carriages 3 to the fixed station 20. This permits simultaneous transmission and reception of signals and enhances communication efficiency.

It should be apparent to those skilled in the art that the present invention may be embodied in many other specific forms without departing from the spirit or scope of the invention. Particularly, it should be understood that the invention may be embodied in the following forms.

Figure 6:
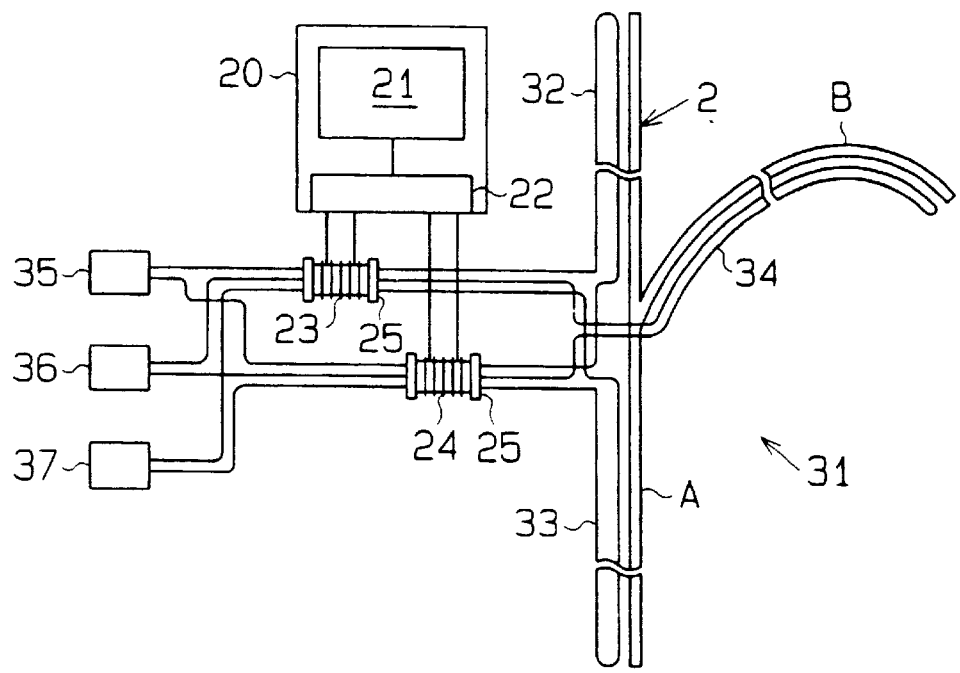
FIG. 6 is a diagrammatic view showing a conveying system according to a further embodiment of the present invention.

(1) As shown in FIG. 6, the present invention may be applied to a conveying system 31 having a plurality of branched rails 2. The rail 2 has a substantially straight portion A and a curved portion B, which branches off from the middle of the straight portion A. A power cable 32 extends toward one end of the straight portion A from the branching point while another power cable 33 extends toward the other end of the straight portion A from the branching point. A further power cable 34 extends along curved portion B. High frequency electric power sources 35, 36, 37 are connected to the cables 32, 33, 34, respectively. The power sources are arranged close to one another near the branching point of the rail 2. Between the power sources 35, 36, 37 and the rail 2, a leg of each cable 32, 33, 34 is bundled into one group by a bobbin 25. The other leg of each cable 32, 33, 34 is also bundled into a further group by another bobbin 25. The transmission antenna 23 is wound about one of the bobbins 25 while the reception antenna 24 is wound about the other bobbin 25. In this manner, cables 32, 33, 34 connected to different power sources 35, 36, 37 are connected to the same antennas 23, 24.

Figure 7:
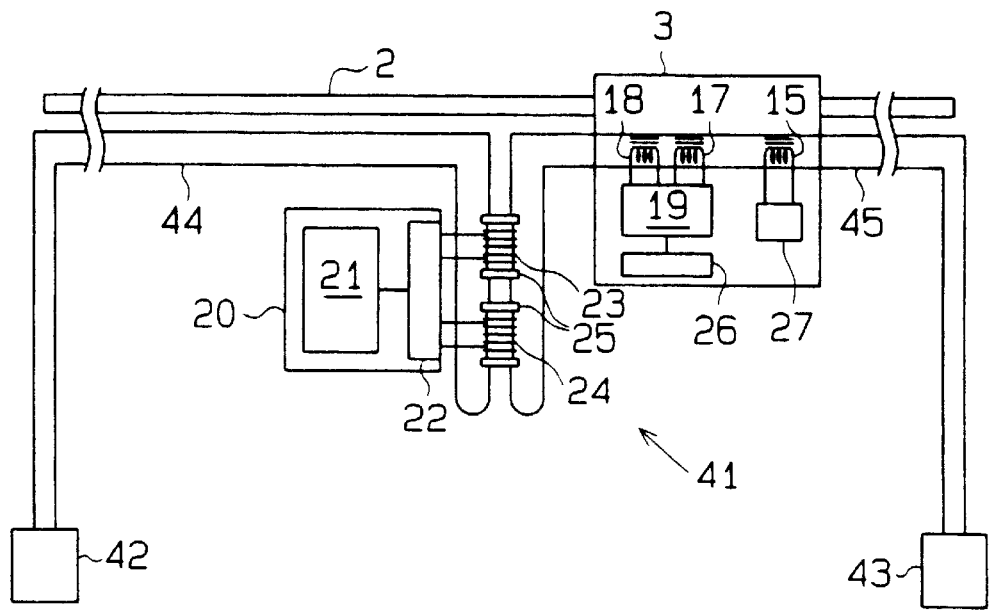
FIG. 7 is a diagrammatic view showing a conveying system according to a further embodiment of the present invention.

(2) As shown in FIG. 7, the present invention may be applied to a conveying system 41 having two electric power sources 42, 43, each being located at either end of the rail 2. A power cable 44 connected to the power source 42 extends from one end of the rail 2 and is bent back toward the power source 42 at the middle section of the rail 2. Another power cable 45 connected to the power source 43 extends from the other end of the rail 2 and is bent back toward the power source 43 at the middle section of the rail 2. The bent portion of each cable 44, 45 extends downward from the middle section of the rail 2. One leg of the cable 44 and one leg of the cable 45 extend through the bobbin 25. The other leg of the cable 44 and the other leg of the cable 45 extend through another bobbin 25. The transmission antenna 23 is wound about one of the bobbins 25 while the reception antenna 24 is wound about the other bobbin 25. This structure also enables the cables 44, 45 that are connected to different power sources 42, 43 to be connected to the same antennas 23, 24 and the same modem 22.

Figure 8:
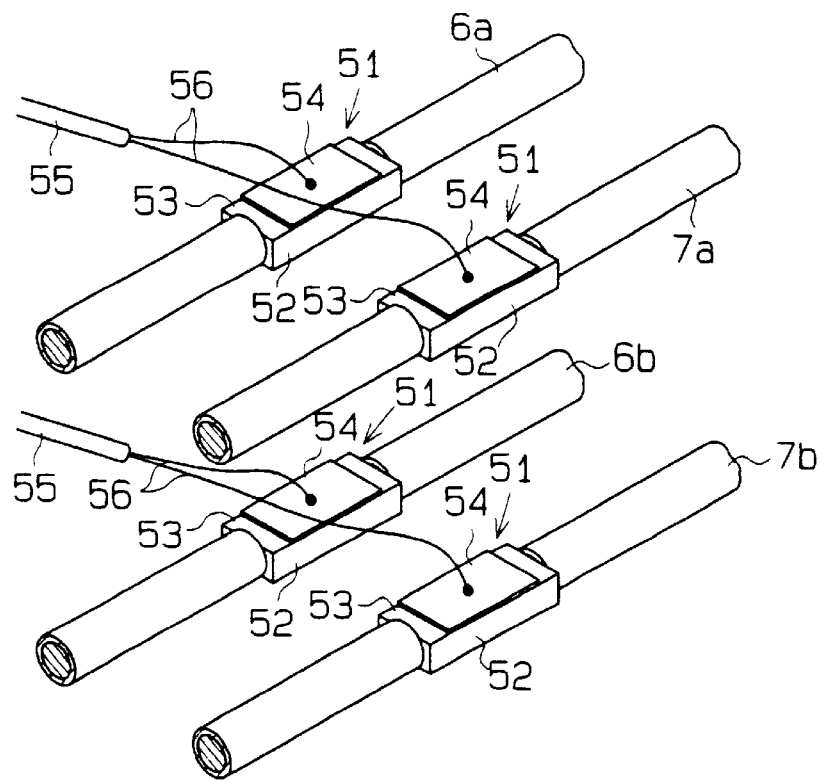
FIG. 8 is a fragmentary perspective view showing an antenna employed in a further embodiment of the present invention.

(3) As shown in FIG. 8, a capacitive coupling type communication antenna 51 may be employed in the present invention. The antenna 51 is provided on each cable leg 6a, 6b, 7a, 7b. Each antenna 51 includes a copper bar 52 arranged on the associated cable leg 6a, 6b, 7a, 7b, an insulating film 53 applied to the surface of the copper bar 52, and a metal sheet 54 joined to the insulating film 53. The copper bar 52 and the metal sheet are capacitively coupled to each other. Two signal wires 56 extending from a single BNC cable 55 are each connected to the surface of the metal sheet 54 of either one of the cable legs 6a, 7a or 6b, 7b. The BNC cable 55 connected to the cable legs 6a, 7a and the BNC cable 56 connected to the cable legs 6b, 7b are each connected to the same modem 22. This structure enables the cables 6, 7 to use the same BNC cable 55 and the same modem 22.

Figure 9A:
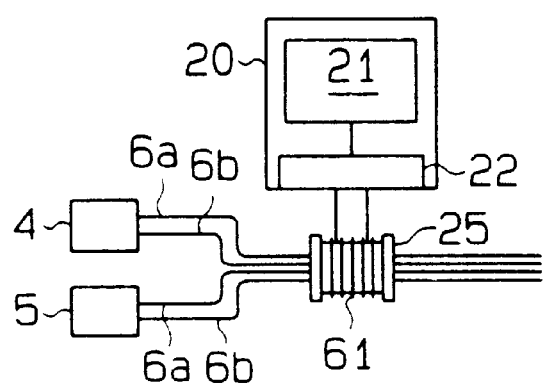
FIGS. 9A, 9B, and 9C are perspective views showing structures for securing transmission and reception antennas employed in a further embodiment of the present invention.
Figure 9B:
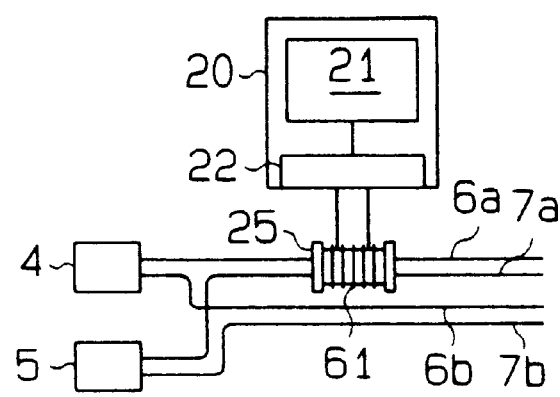
Figure 9C:
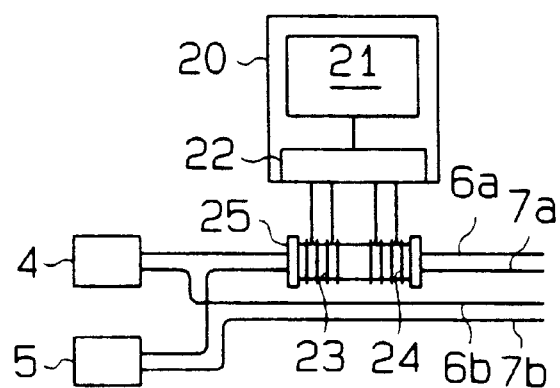

(4) As shown in FIG. 9A, all four of the cable legs 6a, 6b, 7a, 7b may be bundled together by a single bobbin 25. A single communication antenna 61 having the combined functions of signal transmission and signal reception is connected to the bobbin 25. In another embodiment, as shown in FIG. 9B, two of the cable legs 6a, 7a are engaged with a single bobbin 25, which is connected to a communication antenna 61 having the combined functions of signal transmission and signal reception. In a further embodiment, as shown in FIG. 9C, two of the cable legs 6a, 7a are engaged with a single bobbin 25. A transmission antenna 23 and a reception antenna 24 are connected to the bobbin 25. The embodiments illustrated in FIGS. 9B and 9C are especially optimal for conveying systems that employ three or more power sources since many power cables are necessary in such cases. The antennas 23, 24, 61 may be wound directly about a plurality of cable legs without using the bobbin 25. In conveying systems provided with three or more power sources, two of the power cables may use the same communication device while the remaining power cables do not use the same communication device.

(5) The present invention may be applied to conveying systems provided with unmanned conveyor carriages that travel along a rail extending along the ground. The present invention may also be applied to automatic warehouse systems that are provided with stacker cranes.

Therefore, the present examples and embodiments are to be considered as illustrative and not restrictive and the invention is not to be limited to the details given herein, but may be modified within the scope and equivalence of the appended claims.

What is claimed is:

1. A system for carrying out communication between a fixed station and a carriage moved along a rail, the system comprising:

at least two electric power sources;

a cable connected to each power source and extending along at least a portion of the rail, wherein the cables transmit electrical power from the power sources to the carriage to allow the carriage to move along the rail; and a communication antenna coupled to a set of the cables, wherein the set includes at least two separate ones of the cables, for transmitting and/or receiving communication signals superimposed on the electrical current flowing through the cable set.

2. The system according to claim 1 further comprising:

a communication device connected to the communication antenna and the fixed station.

3. The system according to claim 2, wherein the communication device includes a modem.

4. The system according to claim 1, wherein each cable extends along a designated section of the rail.

5. The system according to claim 1, wherein the cables making up the set are in close proximity to each other at the location of the coupled communication antenna.

6. The system according to claim 1, wherein the communication antenna is located between the rail and the power sources.

7. The system according to claim 1, wherein the communication antenna includes a coil wound about the set of cables.

8. The system according to claim 1, wherein the rail is branched at a branching point, and wherein the cables extend away from the vicinity of the branching point of the rail for connection with their associated power sources.

9. The system according to claim 1 further comprising a to bobbin for bundling together the at least two cables, and wherein the communication antenna includes a coil wound about the bobbin.

10. The system according to claim 1, wherein each cable includes a conductive member and wherein the communication antenna includes a conductive plate capacitively coupled to the surface of the conductive member of the associated cable.

11. The system according to claim 1, wherein the communication antenna includes a transmission antenna for transmitting communication signals to the carriage and a reception antenna for receiving communication signals from the carriage.

12. The system according to claim 1, wherein the communication antenna includes a transmission coil for transmitting communication signals to the carriage and a reception coil for receiving communication signals from the carriage.

13. The system according to claim 1, wherein the communication antenna includes a transmission/reception coil having the combined functions of transmitting communication signals to the carriage and receiving communication signals from the carriage.

14. The system according to claim 1, wherein each cable includes a first leg and a second leg, wherein the first legs share a transmission antenna for transmitting communication signals to the carriage, and the second legs share a reception antenna for receiving communication signals from the carriage.

15. The system according to claim 1, wherein each cable includes a first leg and a second leg, wherein the first legs share an antenna having the combined functions of transmitting communication signals to the carriage and receiving communication signals from the carriage.

16. The system according to claim 1, wherein each cable includes a first leg and a second leg, wherein the communication antenna includes a transmission coil wound about the first legs to transmit communication signals to the carriage and a reception coil wound about the second legs to receive communication signals from the carriage.

17. A communication system for a plurality of movable bodies that travel along a rail, said communication system comprising:

at least two power sources;

a cable connected to each power source, each cable extending along at least a portion of the rail for conveying electric current, obtained from a respective one of the power sources, to drive the movable bodies, wherein each of the cables has two ends, each of which is connected to its respective power source such that each cable has an outgoing leg and an incoming leg and wherein at least a portion of each of the cables extends substantially parallel to each of the other cables; and a fixed station including a communication antenna coupled to the outgoing legs of the cables for transmitting and/or receiving communication signals superimposed on the electrical current flowing through the cables.

18. A communication system in accordance with claim 17, further comprising:

a bobbin, located proximate to the fixed station, through which each of the outgoing legs of each of the cables passes through a center passage thereof; and wherein the communication antenna comprises a coil wound about the bobbin.

19. The communication system of claim 17, wherein the communication antenna comprises:

a transmission antenna coil wrapped around the outgoing leg of each of the cables for superimposing a current having a first predetermined frequency onto the electric current flowing through the cables; and a reception antenna coil wrapped around the incoming leg of each of the cables for detecting a current having a second predetermined frequency superimposed on the electric current flowing through the cables.

20. The communication system of claim 17, wherein the communication antenna comprises:

a coil, wrapped around the incoming legs and the outgoing legs the cables, for superimposing a current having a first predetermined frequency onto the electric current flowing through the cables and for detecting a current having a second predetermined frequency superimposed on the electric current flowing through the cables.

* * * * *

UNITED STATES PATENT AND TRADEMARK OFFICE
CERTIFICATE OF CORRECTION

PATENT NO. : 5,938,151
DATED : August 17, 1999
INVENTOR(S) : Takasan et al.

It is certified that error appears in the above-identified patent and that said Letters Patent is hereby corrected as shown below:

Column 7, line 43, delete first word "to".

Signed and Sealed this

Twentieth Day of June, 2000

Attest:

Q. TODD DICKINSON

*Attesting Officer*   *Director of Patents and Trademarks*